US007257983B2

(12) United States Patent
Schueler et al.

(10) Patent No.: US 7,257,983 B2
(45) Date of Patent: Aug. 21, 2007

(54) METHOD FOR CORRECTING THE POSITION OF THE ANGULAR MARKS OF AN INCREMENTAL WHEEL OF A ROTATIONAL SPEED SENSOR AND/OR AN ANGLE OF ROTATION SENSOR, AND SYSTEM THEREFOR

(75) Inventors: Matthias Schueler, Steinheim-Hoepfigheim (DE); Ruediger Fehrmann, Leonberg (DE); Dirk Samuelsen, Ludwigsburg (DE); Joachim Palmer, Korntal-Muenchingen (DE); Jens Damitz, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/527,371

(22) PCT Filed: Jul. 8, 2003

(86) PCT No.: PCT/DE03/02260

§ 371 (c)(1), (2), (4) Date: Sep. 27, 2005

(87) PCT Pub. No.: WO2004/025105

PCT Pub. Date: Mar. 25, 2004

(65) Prior Publication Data

US 2006/0096350 A1 May 11, 2006

(30) Foreign Application Priority Data

Sep. 10, 2002 (DE) ................................ 102 41 893

(51) Int. Cl.
*G01P 21/00* (2006.01)

(52) U.S. Cl. ...................................................... 73/1.37

(58) Field of Classification Search .................. 73/1.37
See application file for complete search history.

(56) References Cited

U.S. PATENT DOCUMENTS

| | | | |
|---|---|---|---|
| 4,744,243 | A | 5/1988 | Tanaka |
| 5,611,311 | A | 3/1997 | Tomisawa |
| 5,789,658 | A | 8/1998 | Henn et al. |
| 5,864,775 | A | 1/1999 | Bradshaw |

*Primary Examiner*—Robert Raevis
(74) *Attorney, Agent, or Firm*—Kenyon & Kenyon LLP

(57) ABSTRACT

A method for correcting the position of the angle marks of an incremental gear of a rotary speed sensor and/or rotary angle sensor of an internal combustion engine and to a system therefor. The method is characterized by the following steps: a) recording the angle marks using the rotary speed sensor and/or the rotary angle sensor, b) measuring the combustion chamber pressure in the respective cylinder of the internal combustion engine, c) assigning a measured pressure value to the recorded angle mark positions, d) possibly correcting the measured pressure values in a signal-conditioning device, e) storing the recorded angle mark positions with the appertaining, measured pressure values in a measured value table, f) storing of the ideal pressure values derived at the ideal angle mark positions in a reference table, g) comparing the pressure values, that were measured and possibly preprocessed in the signal-conditioning device to the ideal pressure values, h) determining deviations of the measured angle mark positions from the ideal angle mark positions, at the corresponding cylinder pressure values in an evaluation unit, and i) correcting the measured angle mark positions by the deviations determined.

11 Claims, 2 Drawing Sheets

METHOD FOR CORRECTING THE POSITION OF THE ANGULAR MARKS OF AN INCREMENTAL WHEEL OF A ROTATIONAL SPEED SENSOR AND/OR AN ANGLE OF ROTATION SENSOR, AND SYSTEM THEREFOR

FIELD OF THE INVENTION

The present invention relates to a method for correcting the position of the angle marks of an incremental gear of a rotary speed sensor and/or rotary angle sensor and system therefor.

BACKGROUND INFORMATION

In order to record the rotary speed and angle, especially the crankshaft angle and/or camshaft angle of an internal combustion engine, incremental gears are used. An incremental gear has marks on its circumference which are ideally affixed at equidistant angular distance. The incremental gear is scanned by a sensor element. A post-connected slope evaluation detects the position of the marks from the sensor signal.

However, the actual crankshaft angle is recorded only inaccurately by the marks of the incremental gear. Among other things, the tolerances of the incremental gear (the effective, not equidistant signal-generating wheel marks), of the sensor and the slope evaluation invalidate the angle thus recorded.

Methods are known for adapting the tolerances of the signal-generating wheel and the angular recording (German Published Patent Application No. 42 16 058).

Since a nonuniform rotary motion of the engine is created by compression and expansion of the aspirated air in the cylinders, even in overrun condition, the known adaptation algorithms require models which describe the irregularity with respect to rotation of the engine. After the separation of these signal portions from the measured signal, the signal portions caused by the tolerances of the signal-generating wheel or the angle recording are left over.

By evaluating the left-over signal portions, for instance, according to German Published Patent Application No. 42 16 058, equidistant angle marks cannot be detected and subsequently used for compensating the angle errors. Since the models of the irregularity with respect to rotation of the engine are only conditionally accurate, however, the separation of the signal portions described is only approximately possible. Because of this, there is a residual error for the position of the angle marks.

Furthermore, methods are known of recording and regulating individual parameters of the combustion process in an internal combustion engine, using combustion chamber pressure sensors.

SUMMARY OF THE INVENTION

It is an object of the present invention to make available a method for correcting the position of the angle marks of an incremental gear of a rotary speed and/or rotary angle sensor of an internal combustion engine, and a system for this which makes possible an adaptation of the signals of the incremental gear in a simple and yet very accurate manner.

The present invention has the advantage that, by utilizing the information of the combustion chamber pressure signal, the incremental errors of a measuring system used for recording rotary speed or shaft angle are ascertained and compensated for. This makes possible a more precise control of the internal combustion engine. In particular, using a more accurate angle signal, the fuel quantity to be injected into an internal combustion engine is able to be metered in cam-controlled systems having lower tolerances.

An accurate recording of shaft angles and rotary speed of an internal combustion engine is made possible, in that the position of the angle marks of the incremental gear and of the non-equidistant portion of the distances apart of the angle marks are determined accurately. The non-equidistant spacing of the angle marks are consequently able to be taken into consideration for calculating the shaft angle and the shaft's rotary speed. In special operating situations of the internal combustion engine, the angular correction is ascertained from the combustion chamber pressure signal.

The compression and expansion phases of the cylinders in overrun condition prove particularly suitable for ascertaining the angle mark correction from the cylinder pressure curve. In these phases, the derivative of the combustion chamber pressure signal with respect to the crankshaft angle has very large values.

If the cylinder pressure measurement is triggered by the angle marks, errors in the position of the angle marks lead to cylinder pressures deviating from the error-free case. These deviations may be detected and used to calibrate the angle marks. For this reason, the angle of the crankshaft, for instance, may be more precisely ascertained using the present invention described than using known adaptation methods.

Models for the irregularity with respect to rotation of the internal combustion engine, as are known from the known related art, are not required.

DETAILED DESCRIPTION

Figure 1:
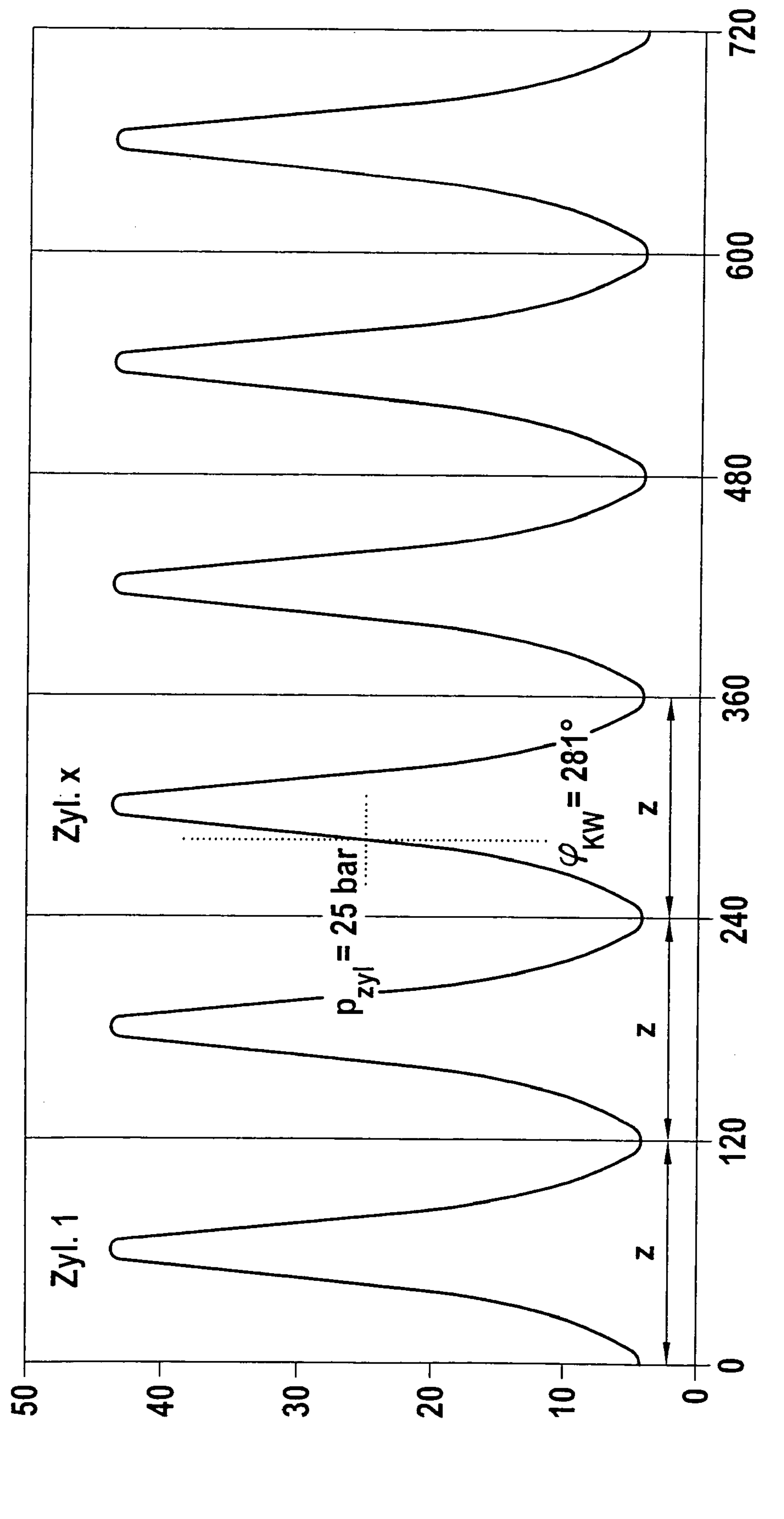
FIG. 1 shows the cylinder pressure of various cylinders of an internal combustion engine plotted against the crankshaft angle.
Figure 2:
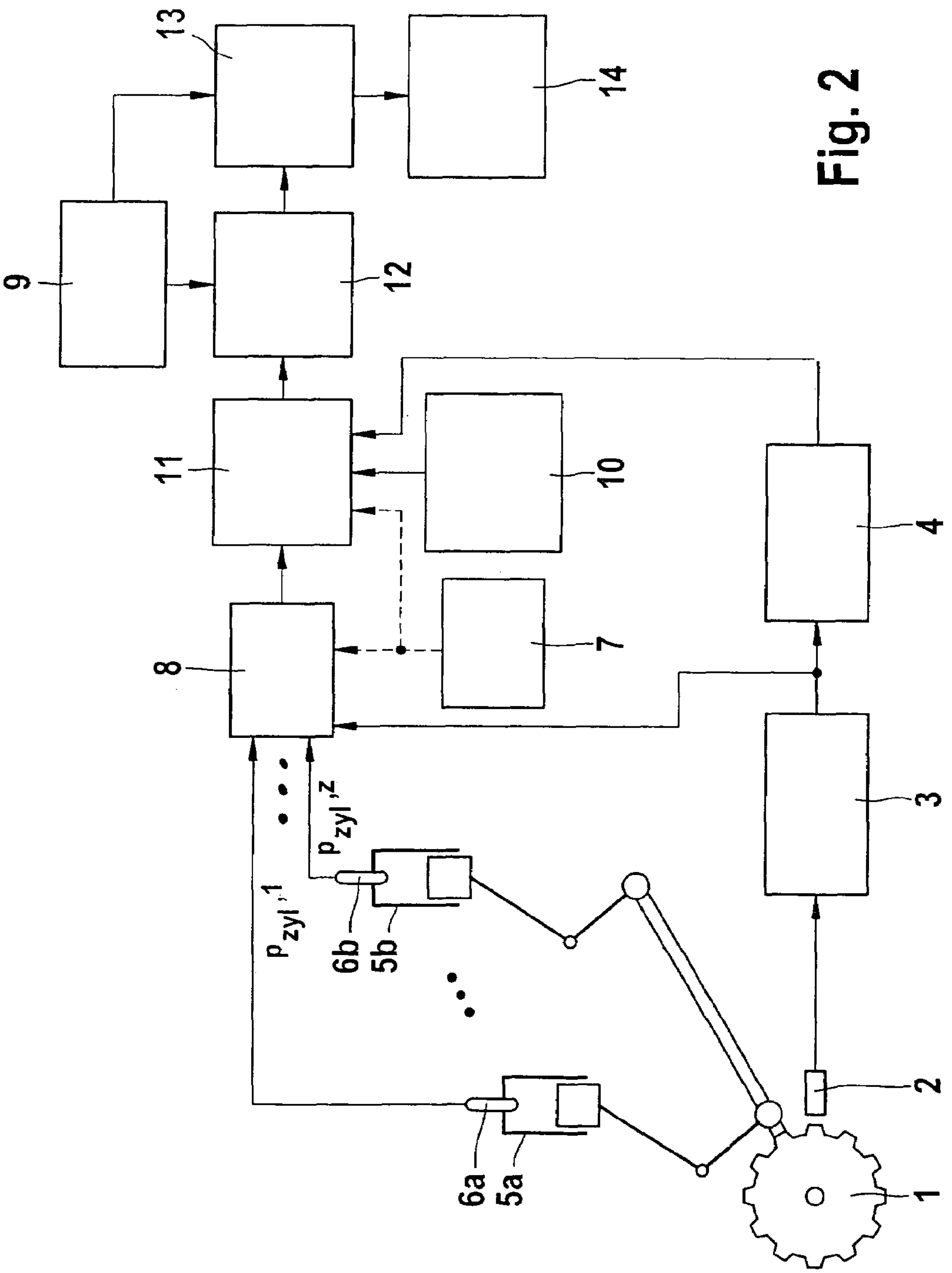
FIG. 2 shows a schematic representation of a system according to the present invention.

According to FIG. 1, as a function of the number Z of the cylinders of the internal combustion engine, the working cycle or the crankshaft angle is subdivided into Z different segments in such a way that in each segment there exists one cylinder whose intake and exhaust valves are closed. This cylinder is, at the moment, in a compression phase or an expansion phase, and is selected for this segment for the evaluation of the cylinder pressure for recording the angle mark position.

In the following, it is described how, according to the present invention, for each segment, the position of the angle marks may be corrected with the aid of the cylinder pressure curve. The crankshaft angle of the internal combustion engine is recorded with the aid of an incremental gear 1 that is connected to the crankshaft. This incremental gear 1 has M marks on its circumference which are ideally affixed at equidistant angular distance. (In the case of incremental gears having missing marks forming a reference gap, M corresponds to the number of complete marks). A sensor element 2 scans the incremental gear. A slope evaluation unit 3 detects the position of the marks from the sensor signal. An incremental counter 4 counts the number k of the marks detected in the current segment. Per segment, preferably 2M/Z marks are present.

Starting from a reference point before the first angle mark, crankshaft angle $\varphi_{KW,nom}(k)$ for angle mark k is given in the error-free case from the incremental counter by the relationship $$\varphi_{KW,nom}(k)=k\cdot\Delta\varphi_{inkr,ideal}.$$

Conditioned upon tolerances of incremental gear 1, sensor element 2 and slope evaluation 3, the angle between individual marks is, however, encumbered with errors, and for each mark k a different angle $\Delta\varphi_{inkr,real}(k)$ is derived.

$$\varphi_{KW,real}(k)=\sum_{i=1}^{k}\Delta\varphi_{inkr,real}(i)\neq k\cdot\Delta\varphi_{inkr,ideal}$$

According to the method according to the present invention, triggered by the detection of the angle marks for each cylinder (5*a*-5*b*) of the internal combustion engine, the combustion chamber pressure $p_{zyl}(\mathbf{1})$, $p_{zyl}(\mathbf{2})$, . . . $p_{zyl}(SM/Z)$ is recorded using pressure sensors (6*a*-6*b*). From this, with the aid of a signal-selecting unit 8, a cylinder counter 7 selects the pressure signal of the cylinder determined for this segment. The measured pressure values are stored in a measured value table 11, and are available for an evaluation at the last angle mark of the segment, after the close of the measurement.

An operating point detection 10 monitors the operating state of the engine and starts the evaluation if the engine is in a predefined operating state. The signal-generating wheel adaptation from the cylinder pressure is carried out preferably in overrun condition, as soon as stable operating conditions set in for the fixed rotary speed. For these operating conditions, a reference table 9 is present in the engine control, in which the cylinder pressures are stored that are derived at the ideal angle mark positions $\varphi_{KW,nom}(k)$. This may, for example, be ascertained beforehand on a test stand for a specimen of this engine type. FIG. 1 shows in each segment an exemplary cylinder pressure curve as it may be stored in the reference table.

Since the cylinder pressure reacts very sensitively to small changes in the operating conditions (charging pressure, charge-air temperature) and, in addition, real cylinder pressure sensors have offset errors and amplification factor errors, a direct comparison of the cylinder pressure values that are measured and tabulated for reference is possible only conditionally.

Therefore, advantageously, a possible amplification factor a and an offset factor b are estimated in a signal-conditioning device 12, and the measured pressure signal is correspondingly corrected. This may be done, for example, with the aid of a least-squares estimating method. In this context, the factors a and b are determined in such a way that $$\sum_{i=1}^{2M/Z}[p_{zyl,table}(i)-(a\cdot p_{zyl,measurement}(i)+b)]^2\rightarrow \text{Min}$$

tends to a minimum. Alternatively to a table, a function may also be used, and the parameters of the function may be estimated correspondingly.

In order to be able to use the method introduced here also in the case of cylinder pressure signals having interference, as a broadening of the present invention, it is also possible, first of all, to store the cylinder pressure values over several working cycles, and to average the measured values for the individual angle marks. By doing this, in addition, stochastic, average-free errors may be compensated for in the signals.

By a comparison of the thus preprocessed, measured cylinder pressure values $a\cdot p_{zyl,measurement}(k)+b$ to the tabulated values, deviations may be determined in an evaluation unit 13 and these, according to the present invention, may be attributed to an erroneous position of the angle marks. The angle $\varphi_{KW,korr}(k)$ belonging to pressure value $a\cdot p_{zyl,measurement(k)}+b$ may be calculated, for instance, from a linear interpolation among the tabulated cylinder pressure values. For the position error one may derive $\Delta\varphi_{KW,korr}=\varphi_{KW,korr}(k)-\varphi_{KW,nom}(k)$. This is stored in an angle correction table 14, to which all the other functions in normal engine operation may have access. An adaptation or correction of the position of the angle marks may be undertaken, and the actual crankshaft angle may be precisely determined. This makes possible a more precise control of the internal combustion engine.

Since the signal amplitude of, for instance, an inductive incremental signal generator is strongly dependent on the speed between the sensor and the angle mark, and thus on the engine's rotary speed, rotary speed-dependent errors may also come about in the slope detection required for the angle mark detection. This rotary speed dependence may be compensated for if the calibration of the angle mark separation distances is carried out from the cylinder pressure signal at different rotary speeds and is stored in the angle correction table as a function of rotary speed.

Since a working cycle is composed of two crankshaft revolutions, in the case of engines having an even number of cylinders Z, the crankshaft angle ranges for cylinders i and i+Z/2 overlap. The evaluation of the pressure signal of the cylinders i=1 . . . Z/2 is sufficient, or the results may have their plausibility checked using the results of cylinders i=Z/2+1 . . . Z. In the case of engines having an uneven number of cylinders, the segments may be chosen smaller, so that they include the ranges having the largest gradient changes in pressure.

As a matter of principle, position errors of the angle marks immediately around the OT are able to be detected only with difficulty, since at that point the gradient $dp_{zyl}/d_{\alpha}$ having the crankshaft angle $\alpha$ has very small values.

The effectiveness of the method with respect to accurate metering in of fuel quantity may be verified by comparing the metering accuracy using the UIS system (angular metering system) without or with active angular correction by the method described in the present invention.

The effectiveness of the method may further be verified by the curve of the incremental times without and with active angular correction to the method described in the present invention. Using active angular correction, a clearly smoother curve of the incremental times sets in than without angular correction.

What is claimed is:

1. A method for correcting a position of angle marks of an incremental gear of at least one of a rotary speed sensor and a rotary angle sensor of an internal combustion engine, comprising:

recording positions of the angle marks using the at least one of the rotary speed sensor and the rotational angle sensor;

measuring combustion chamber pressure values in respective cylinders of the internal combustion engine to produce measured cylinder pressure values;

assigning the measured cylinder pressure values to the recorded angle mark positions;

selectively correcting the measured cylinder pressure values in a signal-conditioning device;

storing the recorded angle mark positions with the appertaining, measured cylinder pressure values in a measured value table;

storing ideal pressure values that are derived at ideal angle mark positions in a reference table;

comparing the measured cylinder pressure values to the ideal pressure values;

determining deviations of the measured angle mark positions from the ideal angle mark positions at the corresponding measured cylinder pressure values in an evaluation unit; and correcting the measured angle mark positions by the determined deviations.

2. The method as recited in claim 1, wherein the determining of the deviations takes place in a range of clearly defined cylinder pressure values.

3. The method as recited in claim 2, wherein the clearly defined cylinder pressure values are maximum values in at least one of a compression phase and an expansion phase of the respective cylinder.

4. The method as recited in claim 3, further comprising:

determining the maximum values via derivatives of combustion chamber pressure signals with respect to a shaft angle.

5. The method as recited in claim 3, wherein the selective correcting of the measured cylinder pressure values is performed by the least squares estimating method.

6. The method as recited in claim 5, wherein, in the least squares estimating method, an amplification factor a and an offset factor b are estimated, the following sum $$\sum_{i=1}^{2M/Z} [p_{zyl,table}(i) - (a \cdot p_{zyl,measurement}(i) + b)]^2 \rightarrow \text{Min}$$

tending to a minimum.

7. The method as recited in claim 1, wherein the measured cylinder pressure values are first measured and stored over several working cycles, and the measured cylinder pressure values are averaged for the individual angle mark positions.

8. The method as recited in claim 1, further comprising:

monitoring an operating state of the internal combustion engine using an operating point detector.

9. The method as recited in claim 1, wherein:

the incremental gear includes a plurality of segments respectively assigned to one cylinder, a signal evaluation unit assigns individual cylinders to the segments from the measured mark positions, and the measured cylinder pressure values of the respective cylinders are assignable to the respective segments.

10. The method as recited in claim 1, further comprising: compensating for a rotary speed function of the recording of the angle mark positions.

11. The method as recited in claim 10, further comprising:

performing a calibration of angle mark separation distances from a cylinder pressure signal at different rotary speeds; and storing the calibration in an angle correction table as a function of rotary speed.

* * * * *